US012261384B2

(12) United States Patent
Omodachi

(10) Patent No.: US 12,261,384 B2
(45) Date of Patent: Mar. 25, 2025

(54) SOCKET CONNECTOR

(71) Applicant: Japan Aviation Electronics Industry, Ltd., Tokyo (JP)

(72) Inventor: Takashi Omodachi, Tokyo (JP)

(73) Assignee: Japan Aviation Electronics Industry, Ltd, Tokyo (JP)

( * ) Notice: Subject to any disclaimer, the term of this patent is extended or adjusted under 35 U.S.C. 154(b) by 343 days.

(21) Appl. No.: 17/743,554

(22) Filed: May 13, 2022

(65) Prior Publication Data

US 2023/0066168 A1 Mar. 2, 2023

(30) Foreign Application Priority Data

Aug. 31, 2021 (JP) ................................ 2021-141031
Sep. 17, 2021 (JP) ................................ 2021-152249

(51) Int. Cl.
*H01R 13/24* (2006.01)
*H01R 12/70* (2011.01)
(Continued)

(52) U.S. Cl.
CPC ......... *H01R 13/24* (2013.01); *H01R 12/7005* (2013.01); *H01R 12/716* (2013.01);
(Continued)

(58) Field of Classification Search
CPC .... H01R 13/24; H01R 13/405; H01R 13/502; H01R 12/716; H01R 24/60
See application file for complete search history.

(56) References Cited

U.S. PATENT DOCUMENTS 9,356,371 B2 * 5/2016 Goto ...................... H01R 12/73
2012/0289096 A1 * 11/2012 Mashiyama ........... H01R 12/73
439/692

(Continued)

FOREIGN PATENT DOCUMENTS

CN 211605453 U 9/2020
CN 112542713 A * 3/2021 ............ H01R 12/72

(Continued)

OTHER PUBLICATIONS

Office Action dated Feb. 3, 2023 in corresponding Taiwan Patent Application No. 111124395, with English Translation.

(Continued)

*Primary Examiner* — Tulsidas C Patel
*Assistant Examiner* — Carlos E Lopez-Pagan
(74) *Attorney, Agent, or Firm* — Renner, Otto, Boisselle & Sklar, LLP

(57) ABSTRACT

An island-like part includes an island-like main part, and two island-like end parts adjacent to the island-like main part in a pitch direction of a plurality of socket contacts. Each of the island-like end parts has an upper surface, an outward lengthwise side surface facing outward in the pitch direction, and two crosswise side surfaces facing in the width direction. Each of the protective metal fittings includes an upper-surface protective part covering an upper surface, an outward protective part extending downward from the upper-surface protective part and covering the outward lengthwise side surface, and two lateral protective parts extending downward from the upper-surface protective part and covering the two crosswise side surfaces, respectively. The outward protective part and the two lateral protective parts are directly connected to each other without the upper-surface protective part being interposed therebetween.

5 Claims, 20 Drawing Sheets

(51) Int. Cl.
*H01R 12/71* (2011.01)
*H01R 13/405* (2006.01)
*H01R 13/502* (2006.01)

(52) U.S. Cl.
CPC ......... *H01R 13/405* (2013.01); *H01R 13/502* (2013.01); *H01R 13/5025* (2013.01)

(56) References Cited

U.S. PATENT DOCUMENTS

| | | | | |
|---|---|---|---|---|
| 2015/0140841 | A1* | 5/2015 | Watanabe .......... | H01R 12/7011 439/74 |
| 2015/0270641 | A1 | 11/2015 | Omodachi et al. | |
| 2015/0380845 | A1 | 12/2015 | Goto et al. | |
| 2018/0331444 | A1 | 11/2018 | Ono | |
| 2019/0148855 | A1 | 5/2019 | Miyazaki et al. | |
| 2019/0181572 | A1 | 6/2019 | Ono | |
| 2020/0144754 | A1 | 5/2020 | Ishida | |
| 2020/0235505 | A1 | 7/2020 | Ono | |
| 2020/0395704 | A1 | 12/2020 | Hosoda | |
| 2023/0065545 | A1 | 3/2023 | Meng et al. | |

FOREIGN PATENT DOCUMENTS

| | | | | |
|---|---|---|---|---|
| CN | 112670729 | A | 4/2021 | |
| CN | 113131242 | A | 7/2021 | |
| JP | 2020077490 | A * | 5/2020 | .......... H01R 12/716 |
| JP | 2020202095 | A | 12/2020 | |
| JP | 6842359 | B2 | 3/2021 | |
| JP | 3239960 | U | 11/2022 | |
| KR | 2013-0111318 | A | 10/2013 | |
| KR | 2015-0109258 | A | 10/2015 | |
| KR | 2015-0110313 | A | 10/2015 | |
| KR | 2020-0008840 | A | 1/2020 | |

OTHER PUBLICATIONS

Office Action dated Feb. 3, 2023 in corresponding Taiwan Patent Application No. 111124394, with English Translation.
Korean Office Action in related application Korean Application No. 2022-0081271 issued on Sep. 26, 2023, with English Translation.
Korean Office Action in related application Korean Application No. 2022-0081272 issued on Mar. 6, 2024, with Machine Translation.
Office Action for corresponding U.S. Appl. No. 17/743,552, issued Jul. 24, 2024.
Office Action dated Dec. 3, 2024 in related Japanese Patent Application No. 2021-141031, with Machine Translation.
Office Action dated Jan. 28, 2025 in related Japanese Patent Application No. 2021-152249, with Machine Translation.

* cited by examiner

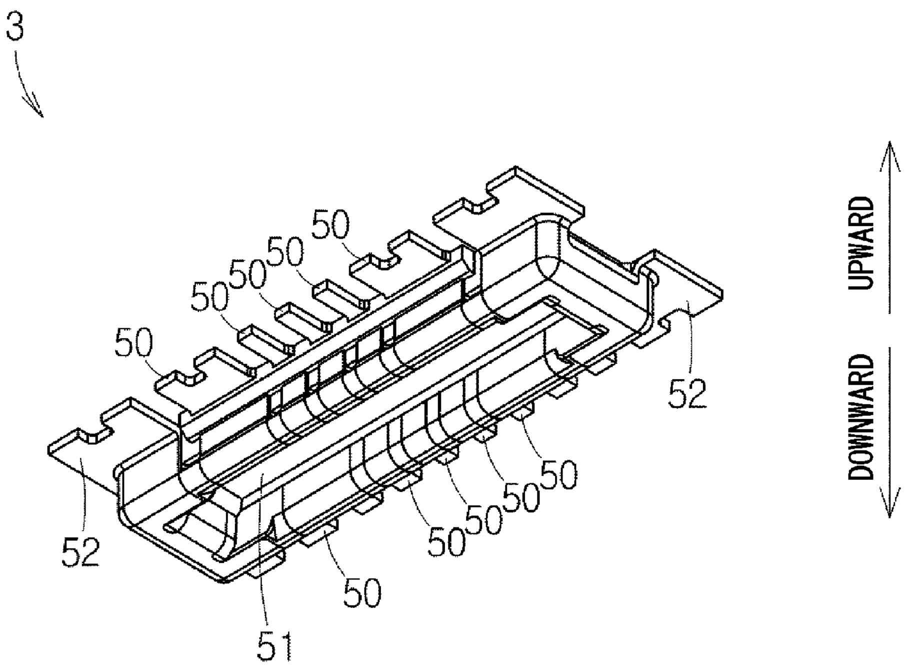
Fig. 18
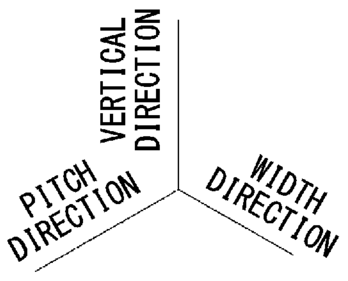

SOCKET CONNECTOR

INCORPORATION BY REFERENCE

This application is based upon and claims the benefit of priority from Japanese patent application No. 2021-141031, filed on Aug. 31, 2021, and Japanese patent application No. 2021-152249, filed on Sep. 17, 2021, the disclosure of which are incorporated herein in its entirety by reference.

BACKGROUND

The present disclosure relates to a socket connector.

As shown in FIG. 20 of the present application, Patent Literature 1 (Japanese Unexamined Patent Application Publication No. 2020-202095) discloses a receptacle connector 100 that serves as a board-to-board connector. The receptacle connector 100 includes a housing 102 having a receptive space 101 that receives a plug connector as an opponent connector, and a reinforcing metal fitting 103. The reinforcing metal fitting 103 is provided to ensure the toughness of the receptacle connector 100. Specifically, the reinforcing metal fitting 103 reinforces a pair of long walls 104 of the housing 102, a short wall 105 of the housing 102, and an end part of an island-shaped projecting wall 106 of the housing 102.

SUMMARY

However, in the above-described configuration disclosed in Patent Literature 1, the reinforcing metal fitting 103 is easily deformed, and there is a risk that it could damage the end part of the projecting wall 106.

One of the objects of the present disclosure is to provide a technique for effectively protecting island-like end parts.

According to an aspect of the present disclosure, a socket connector includes: a housing in which an island-like part and a peripheral wall surrounding the island-like part project upward from a bottom plate; a plurality of contacts arranged in the housing; and a protective metal fitting configured to protect the island-like part, wherein the island-like part includes an island-like main part, and an island-like end part adjacent to the island-like main part in a pitch direction of the plurality of contacts, the island-like end part has an upper surface, a first side surface facing outward in the pitch direction, and two second side surfaces facing in a width direction perpendicular to the pitch direction, the protective metal fitting includes an upper-surface protective part covering the upper surface, a first side-surface protective part extending downward from the upper-surface protective part and covering the first side surface, and two second side-surface protective parts extending downward from the upper-surface protective part and covering the two second side surfaces, respectively, and the first side-surface protective part and the two second side-surface protective parts are directly connected to each other without the upper-surface protective part being interposed therebetween.

According to the present disclosure, island-like end parts can be effectively protected.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 18 is a perspective view of the plug connector as viewed at another angle;

DESCRIPTION OF EMBODIMENTS

Embodiments according to the present disclosure will be described hereinafter with reference to FIGS. 1 to 19.

Figure 1:
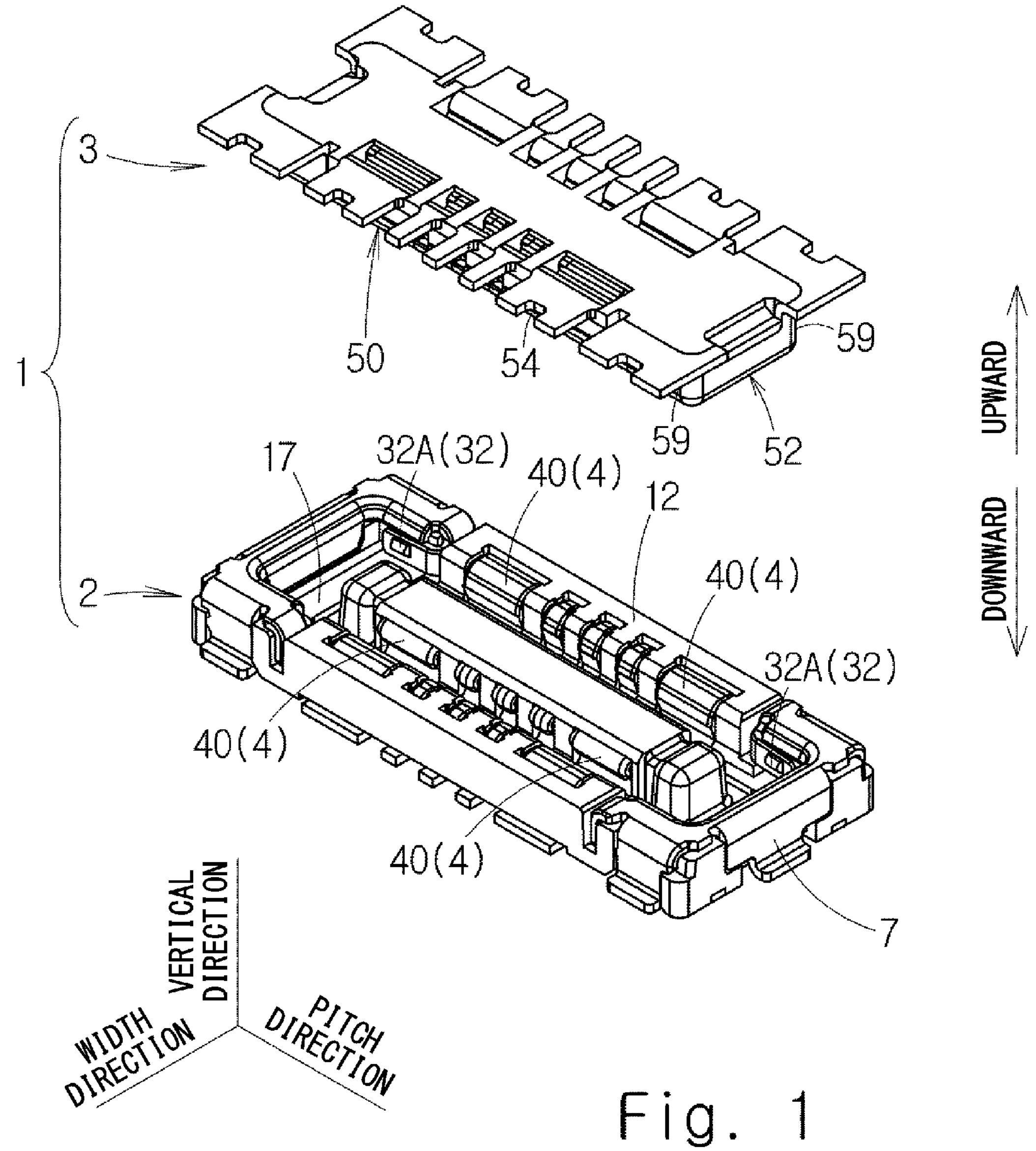
FIG. 1 is a perspective view of a connector assembly.

FIG. 1 shows a connector assembly 1 configured to mechanically and electrically connect two substrates that are parallel to each other. The connector assembly 1 includes a socket connector 2 (a first connector), which will be mounted on a socket side board, i.e., on one of the two boards, and a plug connector 3 (a second connector), which will be mounted on a plug side board, i.e., on the other board. The socket connector 2 is a kind of connector and is also referred to as a receptacle connector.

Figure 2:
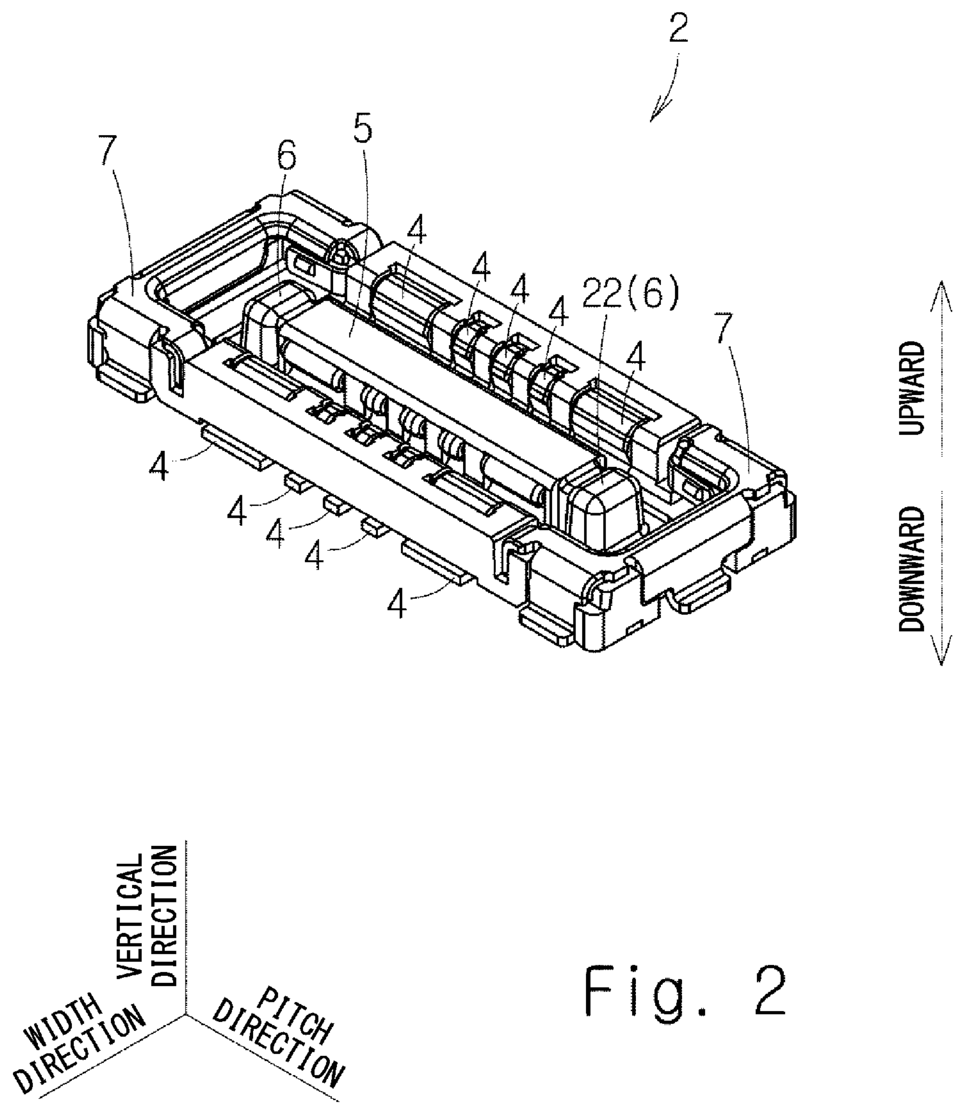
FIG. 2 is a perspective view of a socket connector.
Figure 3:
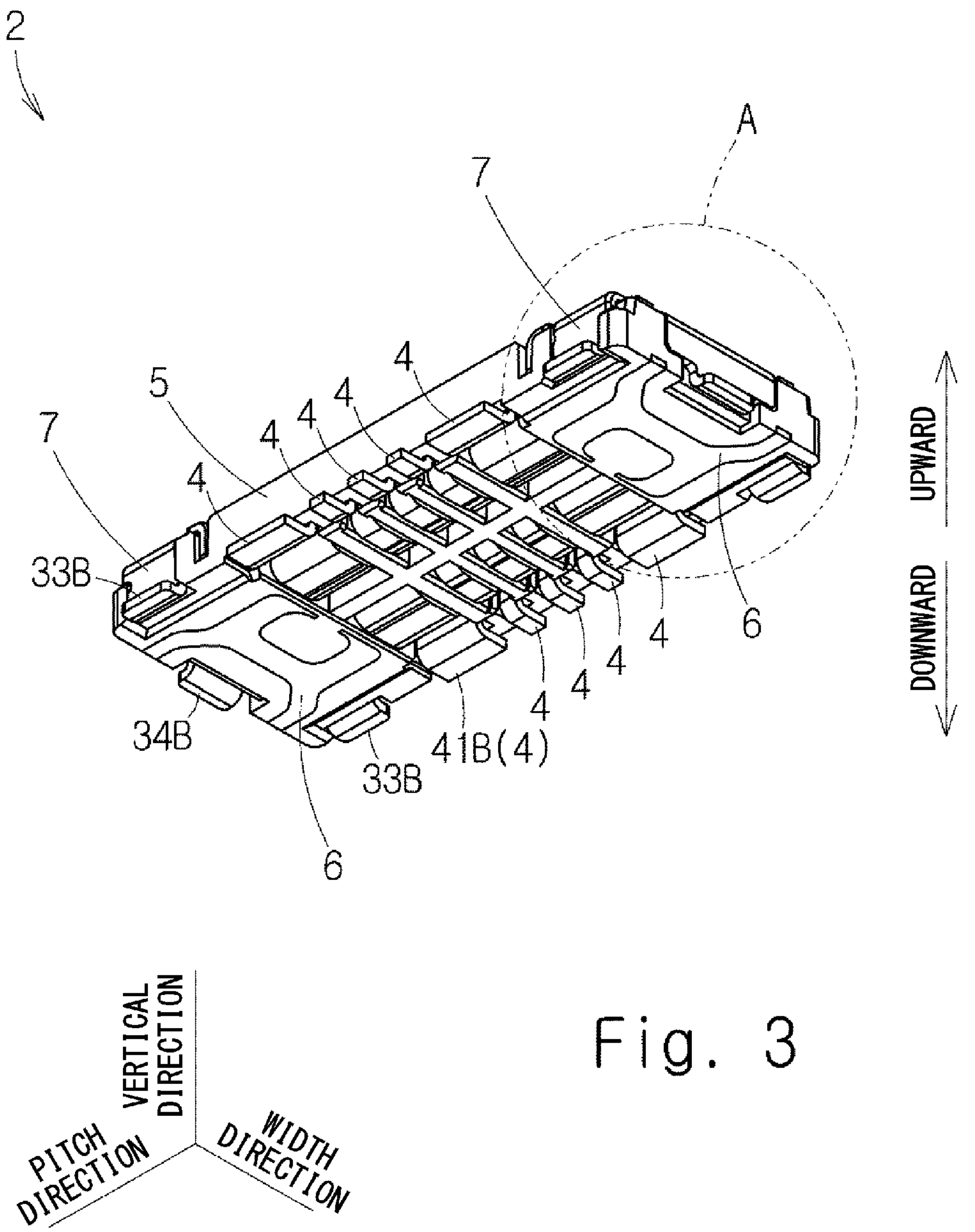
FIG. 3 is a perspective view of the socket connector as viewed at another angle.
Figure 4:
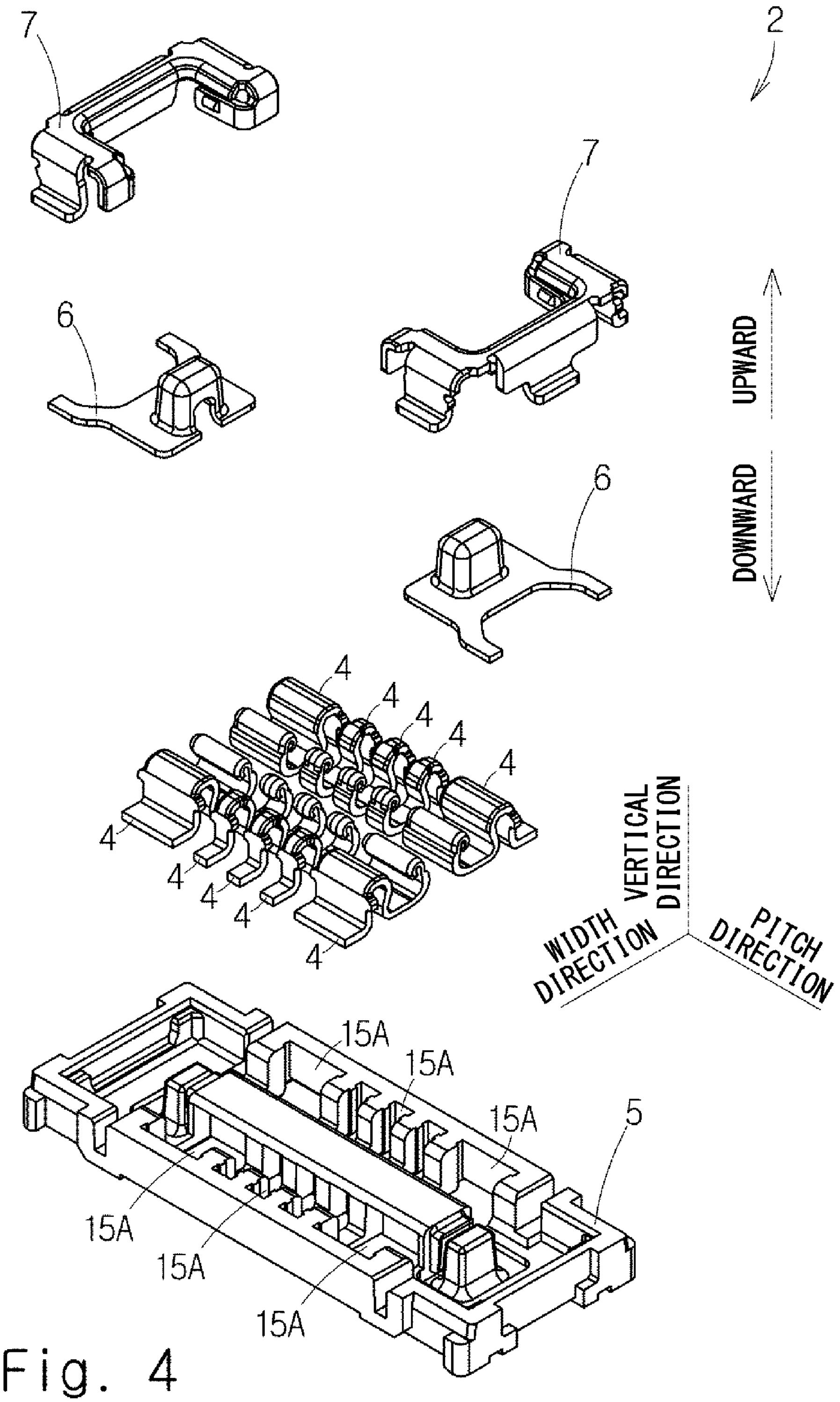
FIG. 4 is an exploded perspective view of the socket connector.

As shown in FIGS. 2 to 4, the socket connector 2 includes a plurality of socket contacts 4 (contacts), a socket housing 5 (a housing) that holds the plurality of socket contacts 4, two protective metal fittings 6, and two socket auxiliary metal fittings 7 (hold-downs).

The plurality of socket contacts 4 are arranged in two rows in a direction parallel to a connector mounting surface of the socket side board. The two socket auxiliary metal fittings 7 are used to fix the socket housing 5 to the connector mounting surface of the socket side board.

Here, with reference to FIGS. 1 and 2, a “vertical direction”, a “pitch direction” and a “width direction” are defined. The vertical direction, the pitch direction, and the width direction are perpendicular to each other.

As shown in FIG. 1, the vertical direction is a direction in which the plug connector 3 is inserted into and removed from the socket connector 2. Therefore, the vertical direction coincides with the height direction of the socket connector 2, and also coincides with the height direction of the plug connector 3. The vertical direction includes an upward direction (a removing direction) and a downward direction (a mating direction). The upward direction is a direction in which the plug connector 3 is removed from the socket connector 2. The downward direction is a direction in which the plug connector 3 is mated with the socket connector 2. The terms "upward" and "downward" are used just for the sake of simplifying the explanation, and do not specify the position of the connector assembly 1 when it is actually used.

As shown in FIG. 2, the pitch direction is a direction in which the plurality of socket contacts 4 are arranged (i.e., lined up). In the case where the plurality of socket contacts 4 are arranged in two rows parallel to each other as described in this embodiment, the pitch direction can be defined as a direction in which a plurality of socket contacts 4 included in one of the two rows are arranged (i.e., lined up). The pitch direction includes inward in the pitch direction and outward in the pitch direction. The inward in the pitch direction is a direction toward the center of the connector assembly 1 in the pitch direction. The outward in the pitch direction is a direction receding from the center of the connector assembly 1 in the pitch direction.

The width direction is a direction perpendicular to the vertical direction and the pitch direction. The width direction includes inward in the width direction and outward in the width direction. The inward in the width direction is a direction toward the center of the connector assembly 1 in the width direction. The outward in the width direction is a direction receding from the center of the connector assembly 1 in the width direction.

(Socket Connector 2)

With reference to FIGS. 2 to 16, the socket connector 2 will be described hereinafter in detail.

As described above with reference to FIGS. 2 to 4, the socket connector 2 includes the plurality of socket contacts 4, the socket housing 5 holding the plurality of socket contacts 4, the two protective metal fittings 6, and the two socket auxiliary metal fittings 7.

Figure 5:
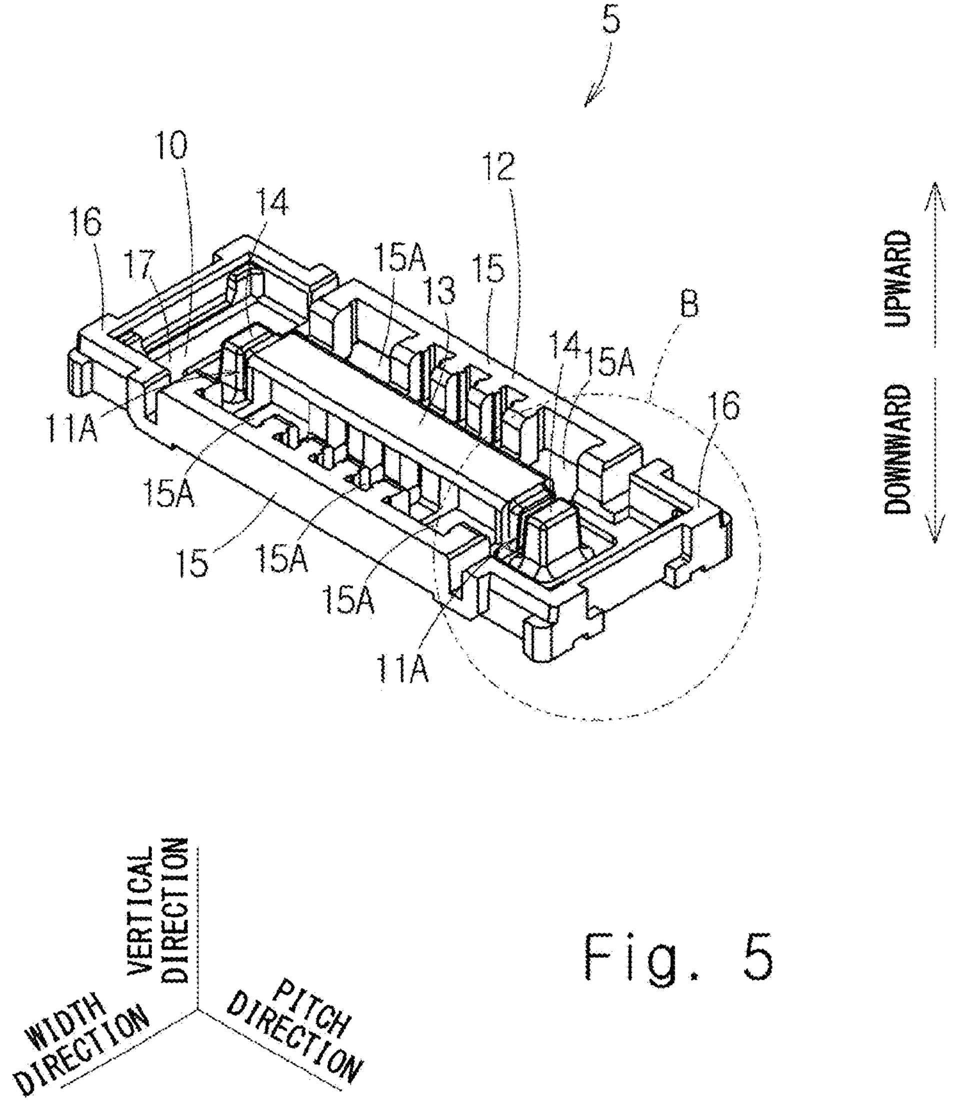
FIG. 5 is a perspective view of a socket housing.

As shown in FIG. 5, the socket housing 5 is a plate member made of an insulating resin, having a rectangular shape in the plan view, and is elongated in the pitch direction. The socket housing 5 includes a bottom plate 10, an island-like part 11, and a peripheral wall 12.

The bottom plate 10 is a flat plate whose thickness direction is parallel to the vertical direction.

The island-like part 11 projects upward from the center of the bottom plate 10 in the pitch and width directions, and extends in an elongated shape in the pitch direction. The island-like part 11 includes an island-like main part 13 and two island-like end parts 14. The two island-like end parts 14 correspond to both ends, respectively, of the island-like part 11 in the pitch direction. The island-like main part 13 is a part located between the two island-like end parts 14. The two island-like end parts 14 are adjacent to the island-like main part 13 in the pitch direction.

As shown in FIGS. 5 to 8, two groove parts 11A are formed in the island-like part 11. The two groove parts 11A are formed in such a way that the two island-like end parts 14 are separated from the island-like main part 13 in the pitch direction. In other words, each of the groove parts 11A is formed between each of the island-like end parts 14 and the island-like main part 13.

Figure 6:
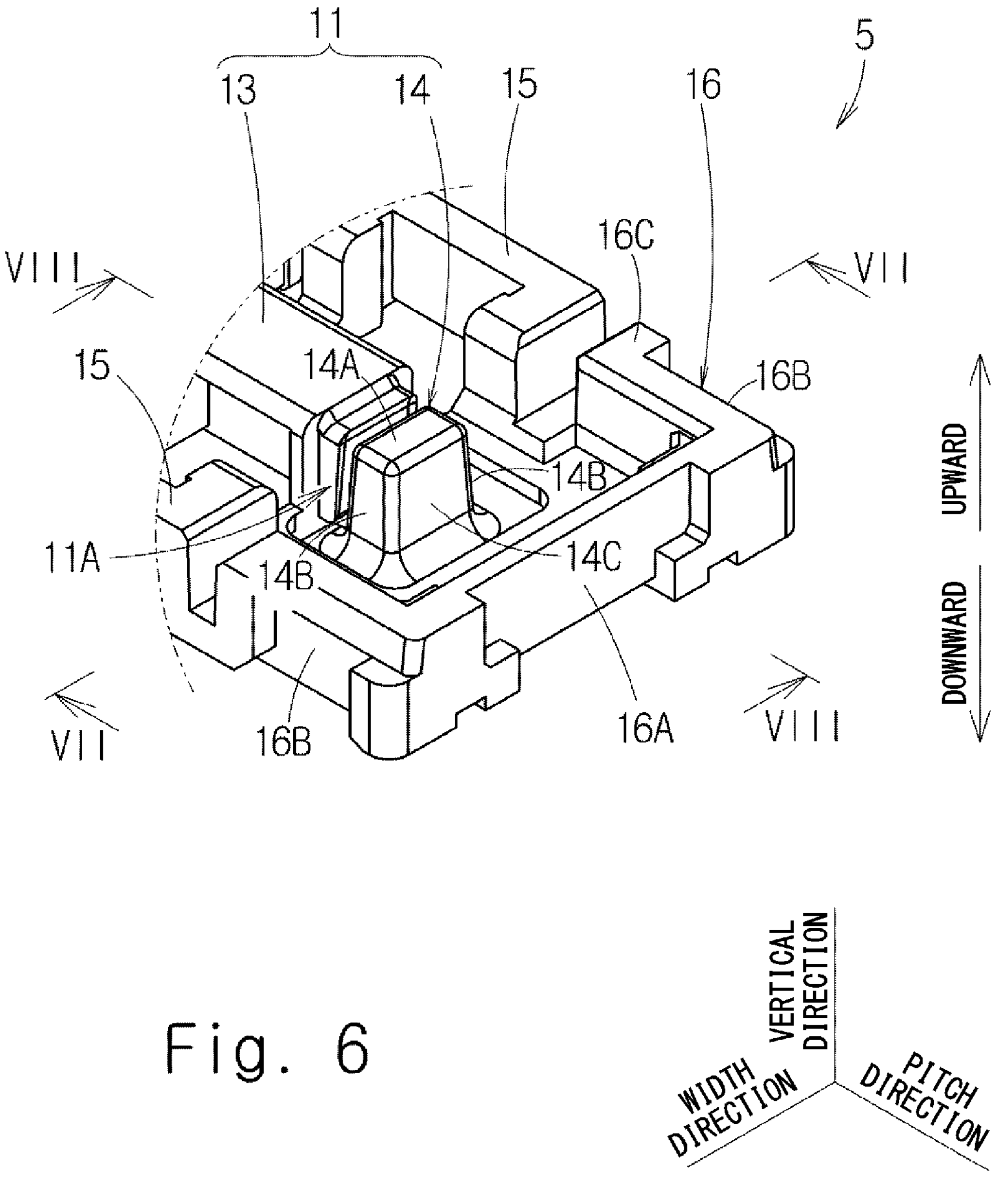
FIG. 6 is an enlarged view of a part B shown in FIG. 5.
Figure 8:
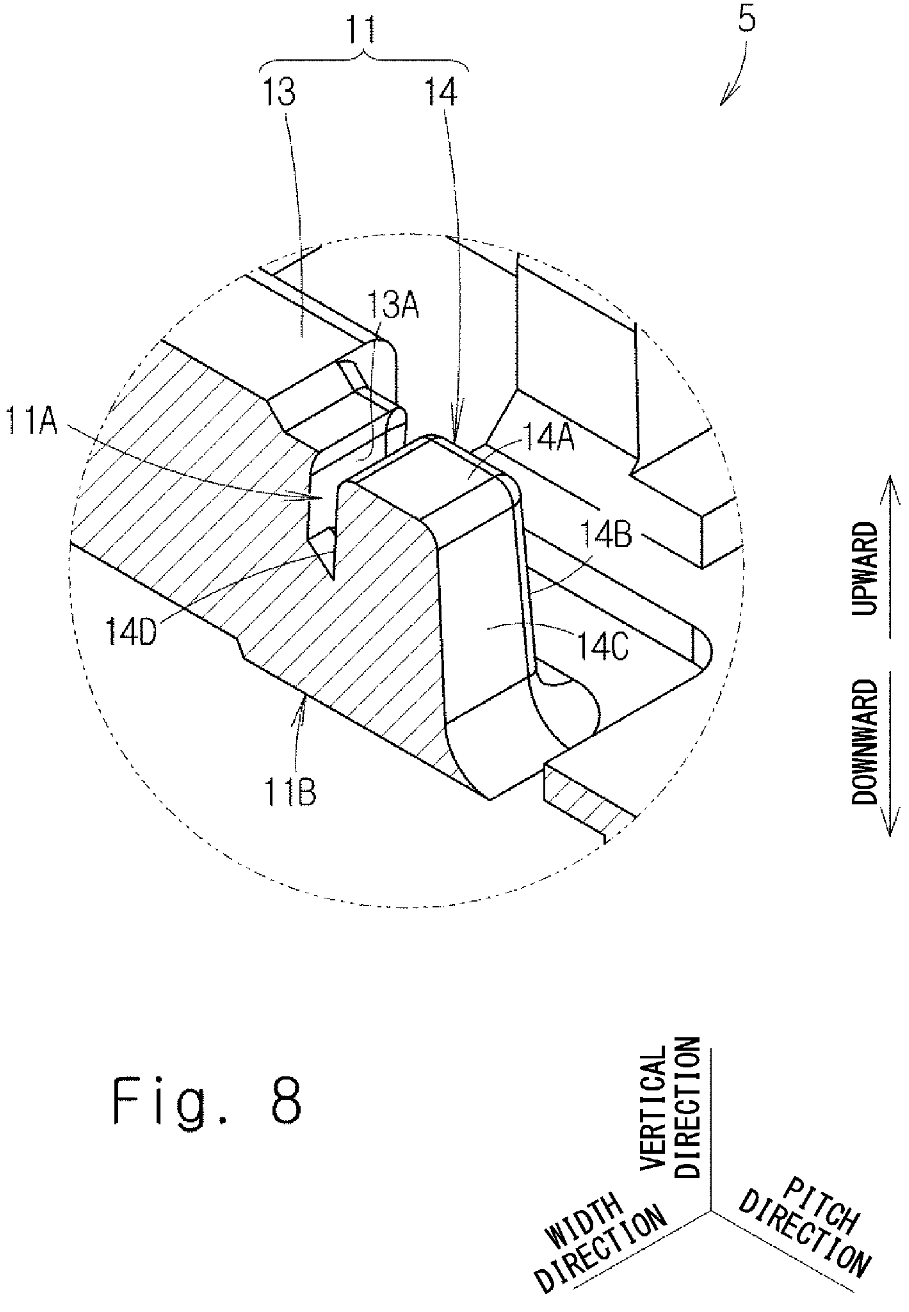
FIG. 8 is a cross-sectional perspective view along arrows VIII-VIII in FIG. 6.

As shown in FIGS. 6 and 8, each of the island-like end parts 14 has an upper surface 14A facing upward, two crosswise side surfaces 14B (second side surfaces) facing outward in the width direction, an outward lengthwise side surface 14C (a first side surface) facing outward in the pitch direction, and an inward lengthwise side surface 14D (a third side surface) facing inward in the pitch direction. The two crosswise side surfaces 14B are surfaces facing opposite to each other.

As shown in FIG. 8, the upper surface 14A is a surface perpendicular to the vertical direction. The two crosswise side surfaces 14B and the outward lengthwise side surface 14C are formed facing slightly upward. The inward lengthwise side surface 14D is a surface perpendicular to the pitch direction.

Figure 7:
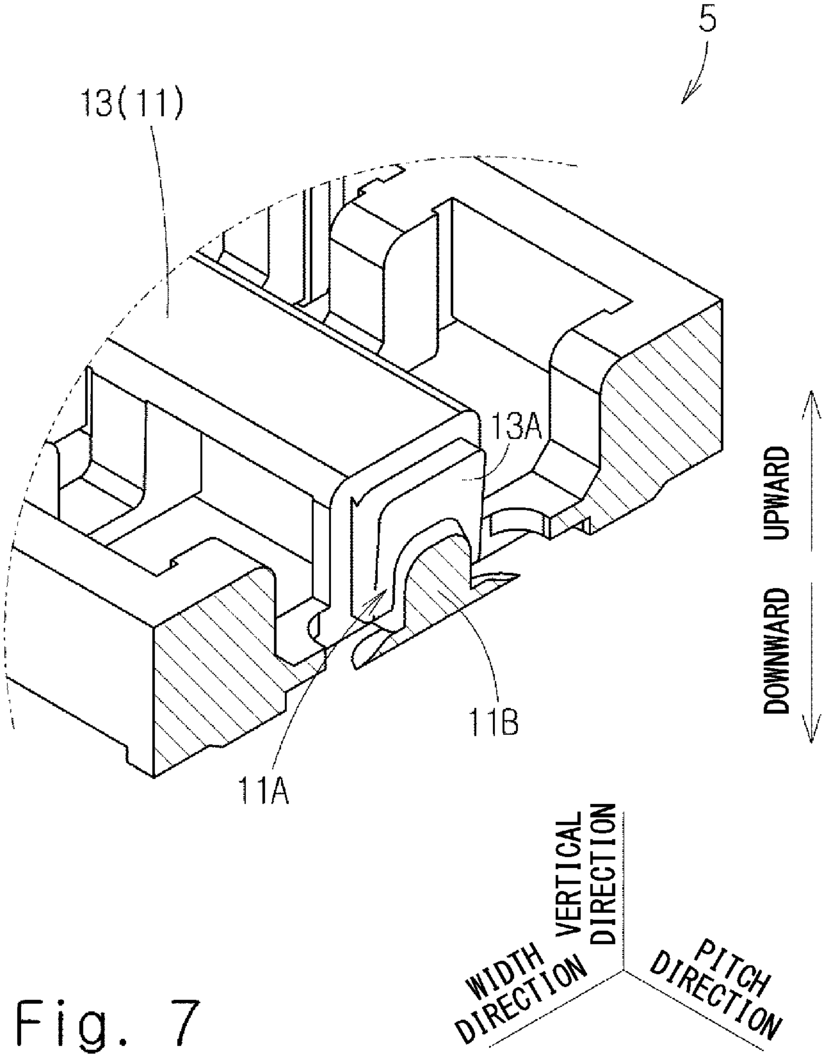
FIG. 7 is a cross-sectional perspective view along arrows VII-VII in FIG. 6.

As shown in FIGS. 7 and 8, a connection part 11B that connects each island-like end part 14 and the island-like main part 13 in the pitch direction is formed between the inward lengthwise side surface 14D of each island-like end part 14 and each side surface 13A facing outward in the pitch direction of the island-like main part 13. Each connection part 11B is connected to a part at the center in the width direction on the downside of the inward lengthwise side surface 14D of each island-like end part 14 and to a part at the center in the width direction on the downside of each side surface 13A. Each connection part 11B is formed to be narrowed toward outward in the pitch direction. In other words, each connection part 11B is formed to be narrowed as it approaches the island-like end part 14.

Referring to FIG. 5 again, the peripheral wall 12 is formed annularly so as to surround the island-like part 11 in the plan view, and projects upward from the bottom plate 10. The peripheral wall 12 includes two contact holding walls 15 that hold the plurality of socket contacts 4, and two auxiliary metal fitting holding walls 16 that hold the two socket auxiliary metal fittings 7, respectively. The island-like part 11 and the two contact holding walls 15 are disposed between the two auxiliary metal fitting holding walls 16 in the pitch direction.

Each of the contact holding walls 15 is disposed so as to be opposed to the island-like part 11 in the width direction. A plurality of slits 15A for holding the plurality of socket contacts 4, respectively, are formed in each of the contact holding walls 15.

As shown in FIG. 6, each of the auxiliary metal fitting holding walls 16 is formed in a U-shape that opens inward in the pitch direction in the plan view. In each of the auxiliary metal fitting holding walls 16, a lengthwise insertion groove 16A that opens outward in the pitch direction and extends in the vertical direction, and two crosswise press-fitting grooves 16B that open outward in the width direction and extend in the vertical direction are formed. The two crosswise press-fitting grooves 16B are used to attach the corresponding socket auxiliary metal fitting 7 to the auxiliary metal fitting holding wall 16.

Further, as shown in FIG. 5, the peripheral wall 12 is formed annularly with spaces from the island-like part 11 in the pitch and width directions, so that an annular mating recessed part 17 is formed between the island-like part 11 and the peripheral wall 12.

As shown in FIGS. 2 and 5, the two protective metal fittings 6 are provided to protect the two island-like end parts 14 of the island-like part 11, respectively. As shown in FIG. 4, each of the protective metal fittings 6 is formed by punching and drawing one metal plate. Since the shapes of the two protective metal fittings 6 are identical to each other, only one of the protective metal fittings 6 will be described hereinafter, and the description of the other protective metal fitting 6 will be omitted.

Figure 9:
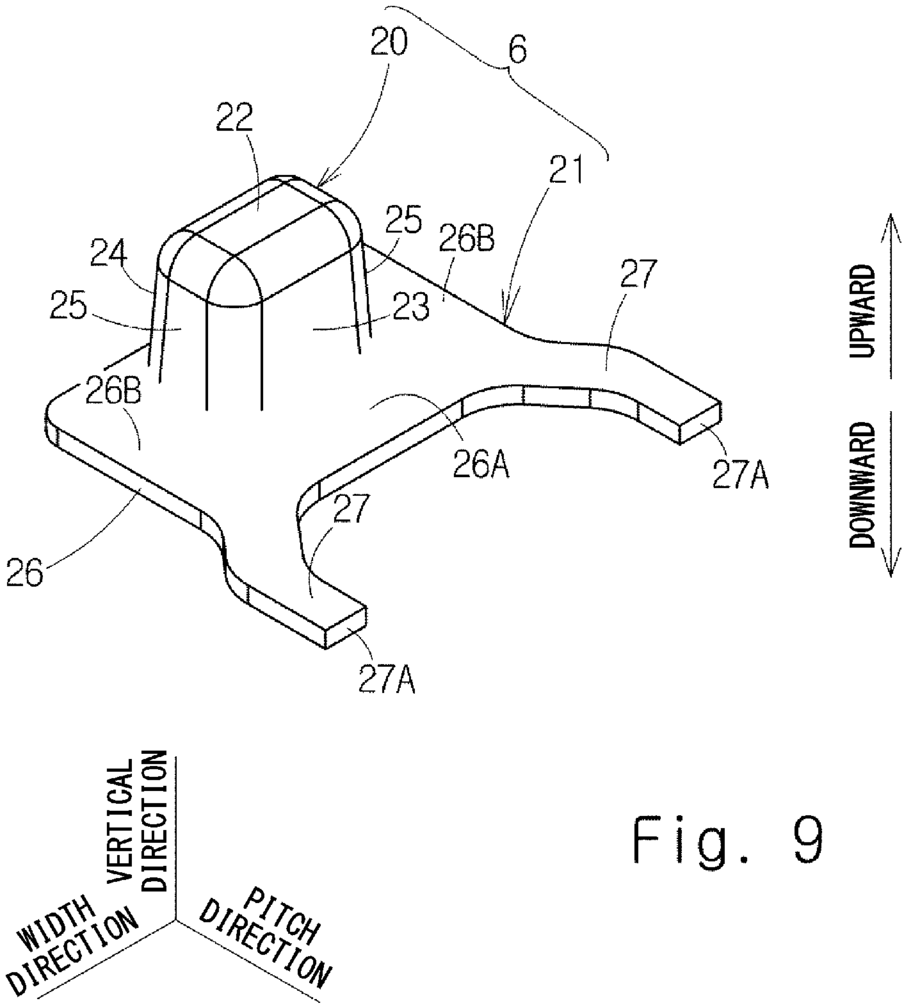
FIG. 9 is a perspective view of a protective metal fitting.
Figure 10:
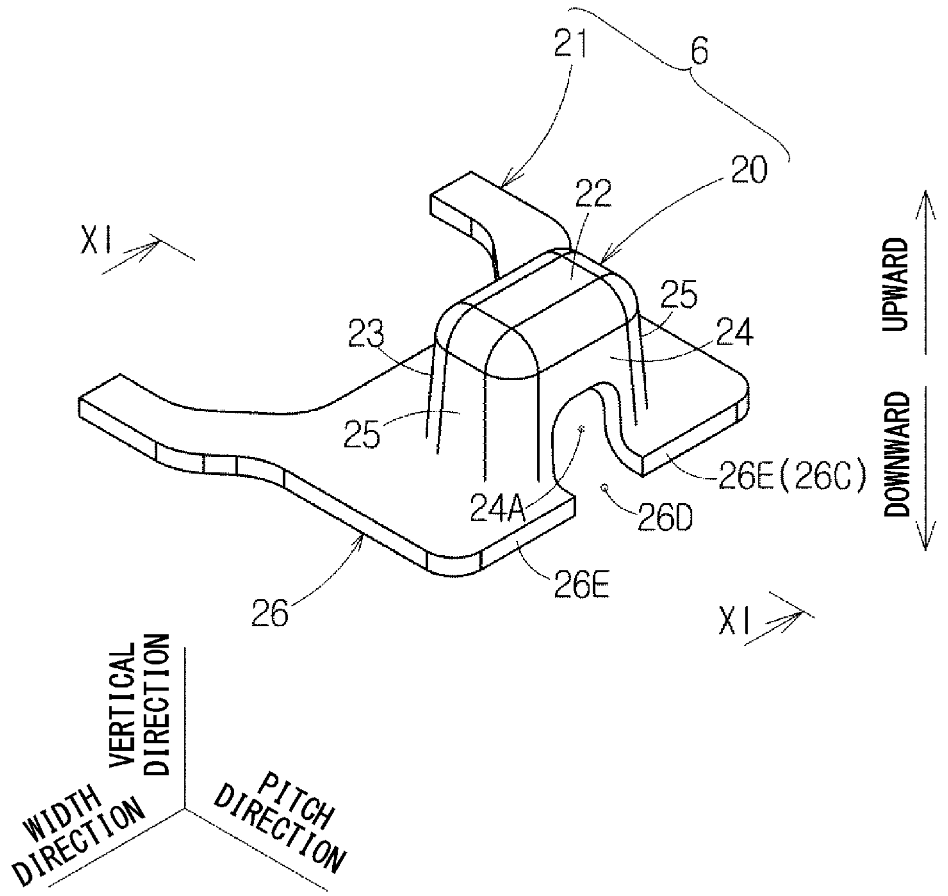
FIG. 10 is a perspective view of the protective metal fitting as viewed at another angle.
Figure 11:
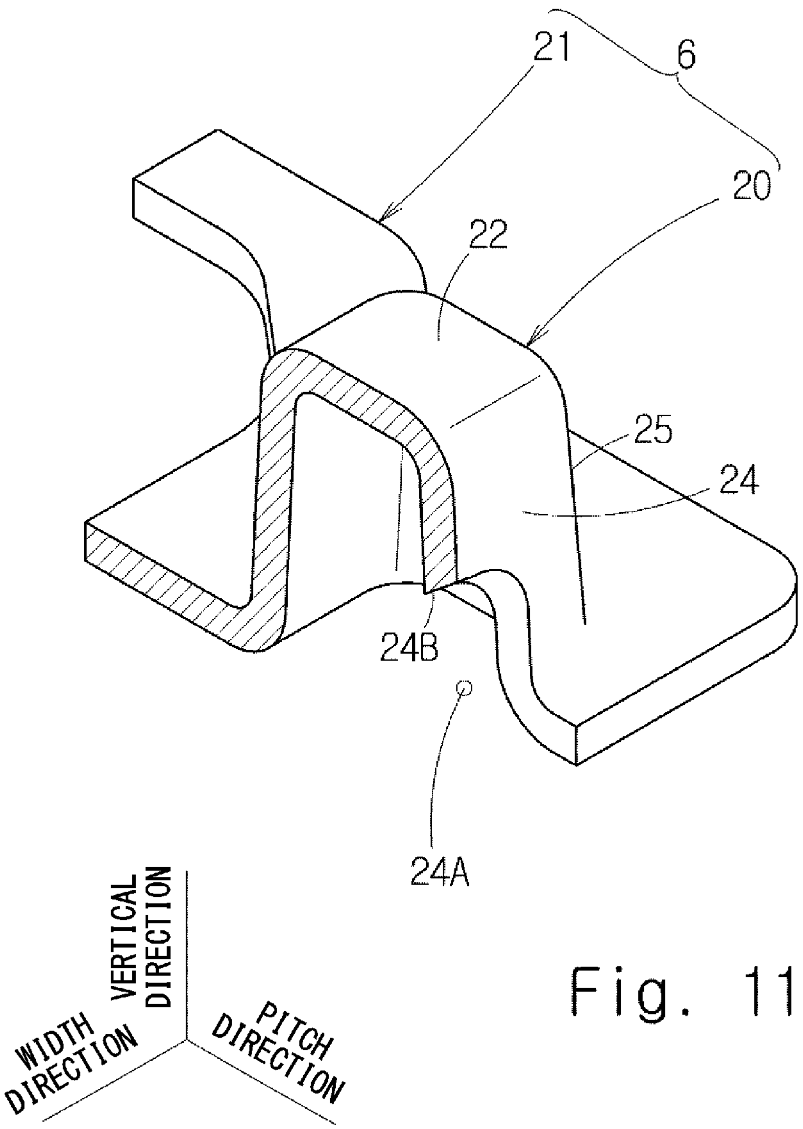
FIG. 11 is a cross-sectional perspective view along arrows XI-XI in FIG. 10.

FIGS. 9 to 11 show the protective metal fitting 6. The protective metal fitting 6 includes a cup-shaped protective part 20 and a socket flange part 21 (flange part).

The cup-shaped protective part 20 is formed in a cup shape that opens downward by a drawing process. The cup-shaped protective part 20 includes an upper-surface protective part 22, an outward protective part 23 (a first side-surface protective part), an inward covering part 24 (a third side-surface covering part), and two lateral protective parts 25 (second side-surface protective parts).

The upper-surface protective part 22 is a part whose thickness direction is parallel to the vertical direction. The upper-surface protective part 22 is disposed so as to be opposed to the upper surface 14A of the island-like end part 14 shown in FIG. 8 in the vertical direction. The upper-surface protective part 22 covers and protects the upper surface 14A of the island-like end part 14.

Referring back to FIG. 9, the outward protective part 23 is a part that extends downward from the outward end of the upper-surface protective part 22 in the pitch direction. The thickness direction of the outward protective part 23 is substantially parallel to the pitch direction, and to be more precise, is slightly upward. The outward protective part 23 is disposed so as to be opposed to the outward lengthwise side surface 14C of the island-like end part 14 shown in FIG. 8 in the pitch direction. The outward protective part 23 covers and protects the outward lengthwise side surface 14C of the island-like end part 14.

Referring back to FIG. 9, the inward covering part 24 is a part that extends downward from the inward end of the upper-surface protective part 22 in the pitch direction. The thickness direction of the inward covering part 24 is parallel to the pitch direction. The inward covering part 24 is disposed so as to be opposed to the inward lengthwise side surface 14D of the island-like end part 14 shown in FIG. 8 in the pitch direction. In other words, the inward covering part 24 covers the inward lengthwise side surface 14D of the island-like end parts 14. The inward covering part 24 is to be inserted into the groove part 11A. Thus, the inward covering part 24 is disposed so as to be opposed to the side surface 13A of the island-like main part 13 in the pitch direction. As shown in FIGS. 10 and 11, a notch 24A that opens downward is formed in the inward covering part 24. The notch 24A has a shape that is complementary to the connection part 11B shown in FIG. 7. Thus, a ceiling surface 24B that partitions the notch 24A shown in FIG. 11 is inclined downward toward outward in the pitch direction.

Referring back to FIG. 9, the two lateral protective parts 25 are parts that extend downward from the both ends on the outer sides of the upper-surface protective part 22 in the width direction. The thickness direction of each of the lateral protective parts 25 is substantially parallel to the width direction, and to be more precise, is slightly upward. Each of the lateral protective parts 25 is disposed so as to be opposed to each of the crosswise side surfaces 14B of the island-like end part 14 shown in FIG. 6 in the width direction. Each of the lateral protective parts 25 covers and protects each of the crosswise side surfaces 14B of the island-like end part 14.

As shown in FIGS. 9 to 11, the outward protective part 23 and each of the lateral protective parts 25 are directly connected to each other without the upper-surface protective part 22 being interposed therebetween. The inward covering part 24 and each of the lateral protective parts 25 are directly connected to each other without the upper-surface protective part 22 being interposed therebetween. Thus, the outward protective part 23, the inward covering part 24, and the two lateral protective parts 25 form a cylinder that extends in the vertical direction, and the upper end of this cylinder is closed by the upper-surface protective part 22.

On the other hand, the socket flange part 21 has a flat plate shape whose thickness direction is parallel to the vertical direction, and it is connected to the lower end of the outward protective part 23, the lower end of the inward covering part 24, and the lower ends of the two lateral protective parts 25. Thus, the cup-shaped protective part 20 rises upward from the socket flange part 21.

The socket flange part 21 includes a C-shaped part 26 having a C-shape in the plan view and two supporting parts 27.

The C-shaped part 26 is formed to surround the cup-shaped protective part 20 in the plan view. As shown in FIG. 10, the C-shaped part 26 is formed in a C-shape that opens inward in the pitch direction. As shown in FIGS. 9 and 10, the C-shaped part 26 includes an outward flange part 26A that extends outward in the pitch direction from the lower end of the outward protective part 23, two lateral flange parts 26B that extend outward in the width direction from the lower ends of the two lateral protective parts 25, respectively, and an inward flange part 26C that extends inward in the pitch direction from the lower end of the inward covering part 24. In this embodiment, a slit 26D that is connected to the notch 24A is formed in the inward flange part 26C. The inward flange part 26C is divided in the width direction by the slit 26D. Specifically, the inward flange part 26C includes two inward flange divided bodies 26E that are disposed on the opposite sides of each other with the slit 26D interposed therebetween in the width direction. The outward flange part 26A, the two lateral flange parts 26B, and the two inward flange divided bodies 26E are located in the same plane. Thus, the outward flange part 26A and the two lateral flange parts 26B are connected to each other in the same plane. The two lateral flange parts 26B are connected to the two inward flange divided bodies 26E, respectively, in the same plane.

As shown in FIG. 9, the two supporting parts 27 project outward in the pitch direction from the two lateral flange parts 26B, respectively. Thus, the outward flange part 26A and the two supporting parts 27 are formed in a Y-shape that opens outward in the pitch direction in the plan view. In other words, the socket flange part 21 branches off in the width direction while extending outward in the pitch direction. Further, in this embodiment, the protective metal fitting 6 is mounted on the socket housing 5 by insert-molding. The two supporting parts 27 are used to hold the protective metal fitting 6 within the mold during the insert-molding. Specifically, the two supporting parts 27 are connected to a common carrier during the insert-molding. After the insert-molding, the two supporting parts 27 are separated (or cut out) from the carrier. Each of the supporting parts 27 has an end face 27A facing outward in the pitch direction.

As shown in FIG. 2, the two socket auxiliary metal fittings 7 are provided to fix the socket housing 5 to the socket side board. As shown in FIG. 4, each of the socket auxiliary metal fittings 7 is formed by punching and bending one metal plate. Since the shapes of the two socket auxiliary metal fittings 7 are identical to each other, only one of the socket auxiliary metal fittings 7 will be described hereinafter, and the description of the other socket auxiliary metal fitting 7 will be omitted.

Figure 12:
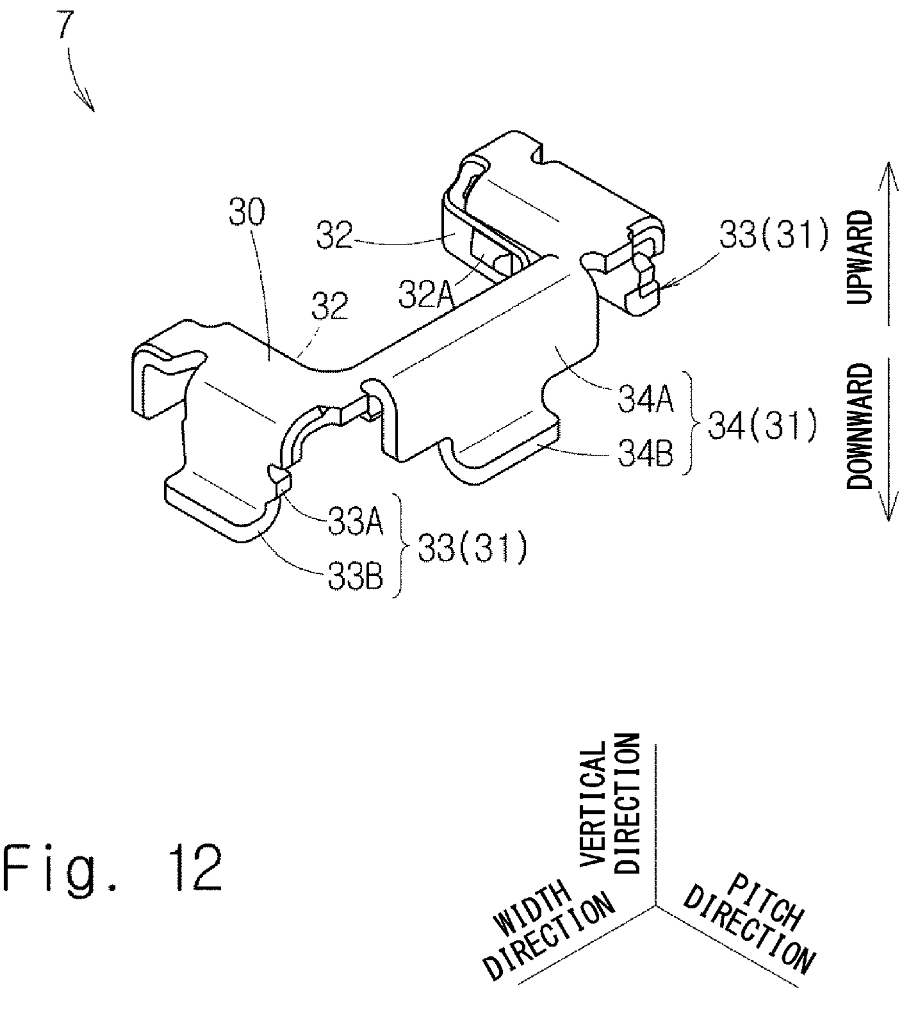
FIG. 12 is a perspective view of a socket auxiliary metal fitting.

As shown in FIG. 12, the socket auxiliary metal fitting 7 includes an upper-surface protective part 30, three soldering legs 31, and two spring pieces 32.

The upper-surface protective part 30 has a U-shape that opens inward in the pitch direction in the plan view, and covers and protects an upper surface 16C of the auxiliary metal fitting holding wall 16 shown in FIG. 6. The thickness direction of the upper-surface protective part 30 coincides with the vertical direction.

Referring back to FIG. 12, the three soldering legs 31 are formed so as to extend downward from the upper-surface protective part 30. The three soldering legs 31 include two crosswise soldering legs 33 and one lengthwise soldering leg 34.

The two crosswise soldering legs 33 are formed so as to project outward in the width direction from the upper-surface protective part 30. Each of the crosswise soldering legs 33 includes a press-fitting part 33A and a soldering part 33B formed at the lower end of the press-fitting part 33A. The press-fitting part 33A is press-fitted into the corresponding crosswise press-fitting groove 16B shown in FIG. 6. The soldering part 33B is soldered to an electrode pad of the socket side board.

The lengthwise soldering leg 34 is formed so as to project outward in the pitch direction from the upper-surface protective part 30. The lengthwise soldering leg 34 includes an extending part 34A and a soldering part 34B formed at the lower end of the extending part 34A. The extending part 34A is inserted into the lengthwise insertion groove 16A shown in FIG. 6. The soldering part 34B is soldered to an electrode pad of the socket side board. The soldering part 34B is disposed at the center of the socket auxiliary metal fittings 7 in the width direction.

Each of the spring pieces 32 is a cantilever supported by the upper-surface protective part 30 and extends in the pitch direction. Each of the spring pieces 32 is configured to be elastically displaceable in the width direction, and has a raised part 32A rising (i.e., projecting) inward in the width direction.

Figure 13:
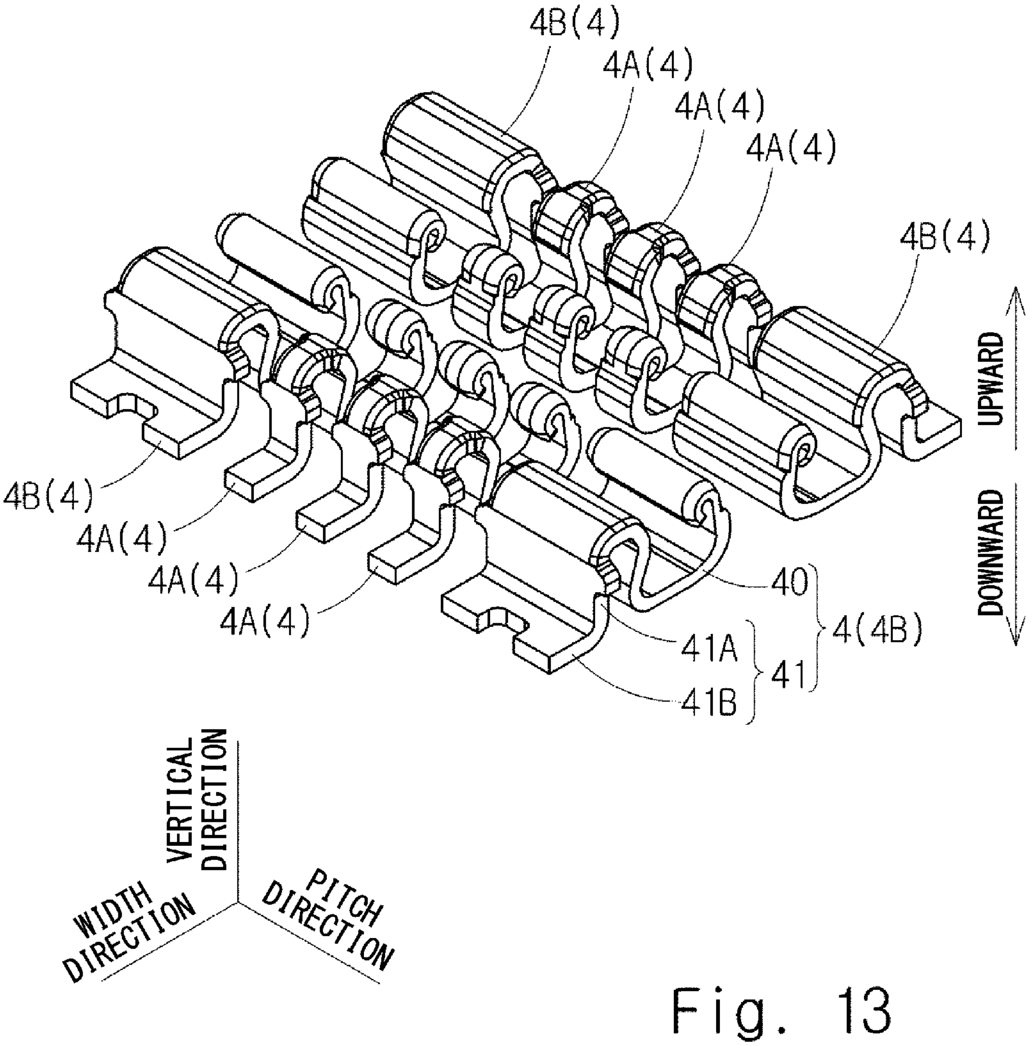
FIG. 13 is a perspective view of a plurality of socket contacts.

FIG. 13 shows the plurality of socket contacts 4. A plurality of socket contacts 4 included in one of the two rows include three signal contacts 4A, which are relatively small in the pitch direction, and two power-supply contacts 4B, which are relatively large in the pitch direction. The three signal contacts 4A are disposed between the two power-supply contacts 4B. Each of the socket contacts 4 is formed by punching and bending one metal plate.

Each of the socket contacts 4 includes a contact part 40 having a U-shape that opens upward and a soldering leg 41 extending downward from the end part on the outer side of the contact part 40 in the width direction. The soldering leg 41 includes a press-fitting part 41A and a soldering part 41B. The press-fitting part 41A is press-fitted into the corresponding slit 15A shown in FIG. 5. The soldering part 41B is soldered to an electrode pad of the socket side board.

Figure 14:
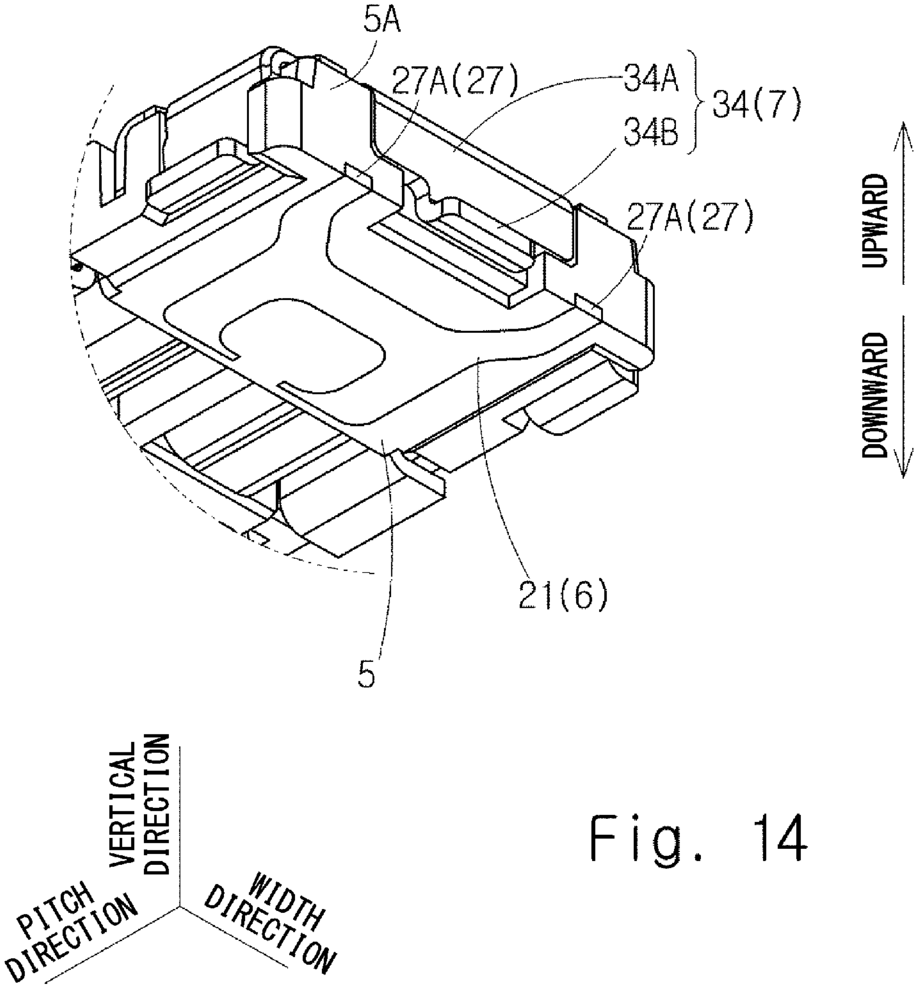
FIG. 14 is an enlarged view of a part A shown in FIG. 3.
Figure 15:
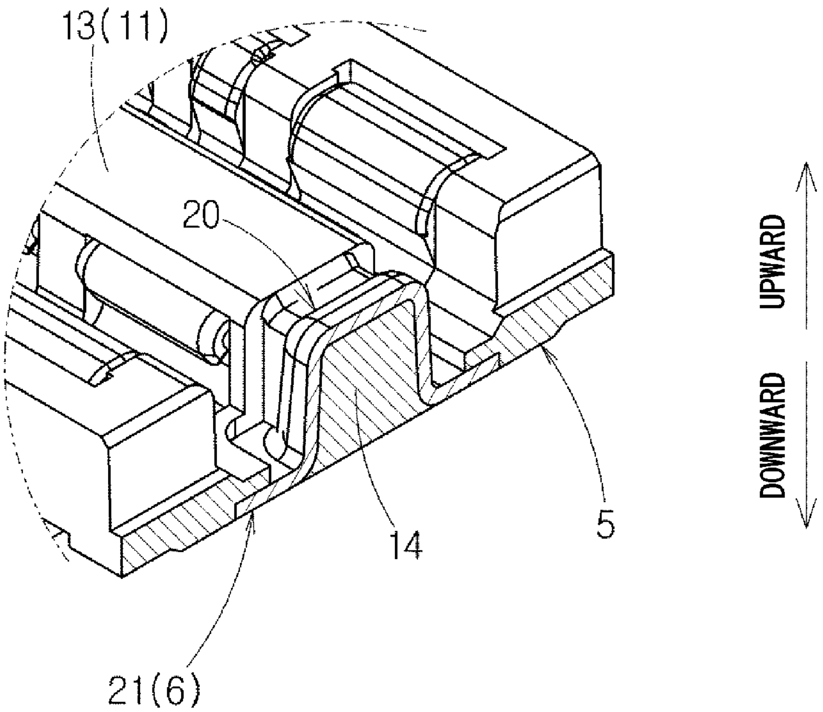
FIG. 15 is a cross-sectional perspective view of the socket connector when the socket connector is cut in the pitch direction.
Figure 15:
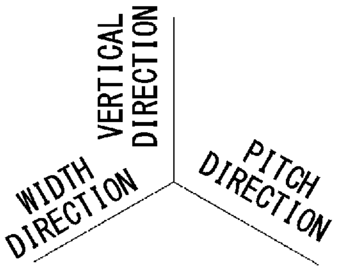
Figure 16:
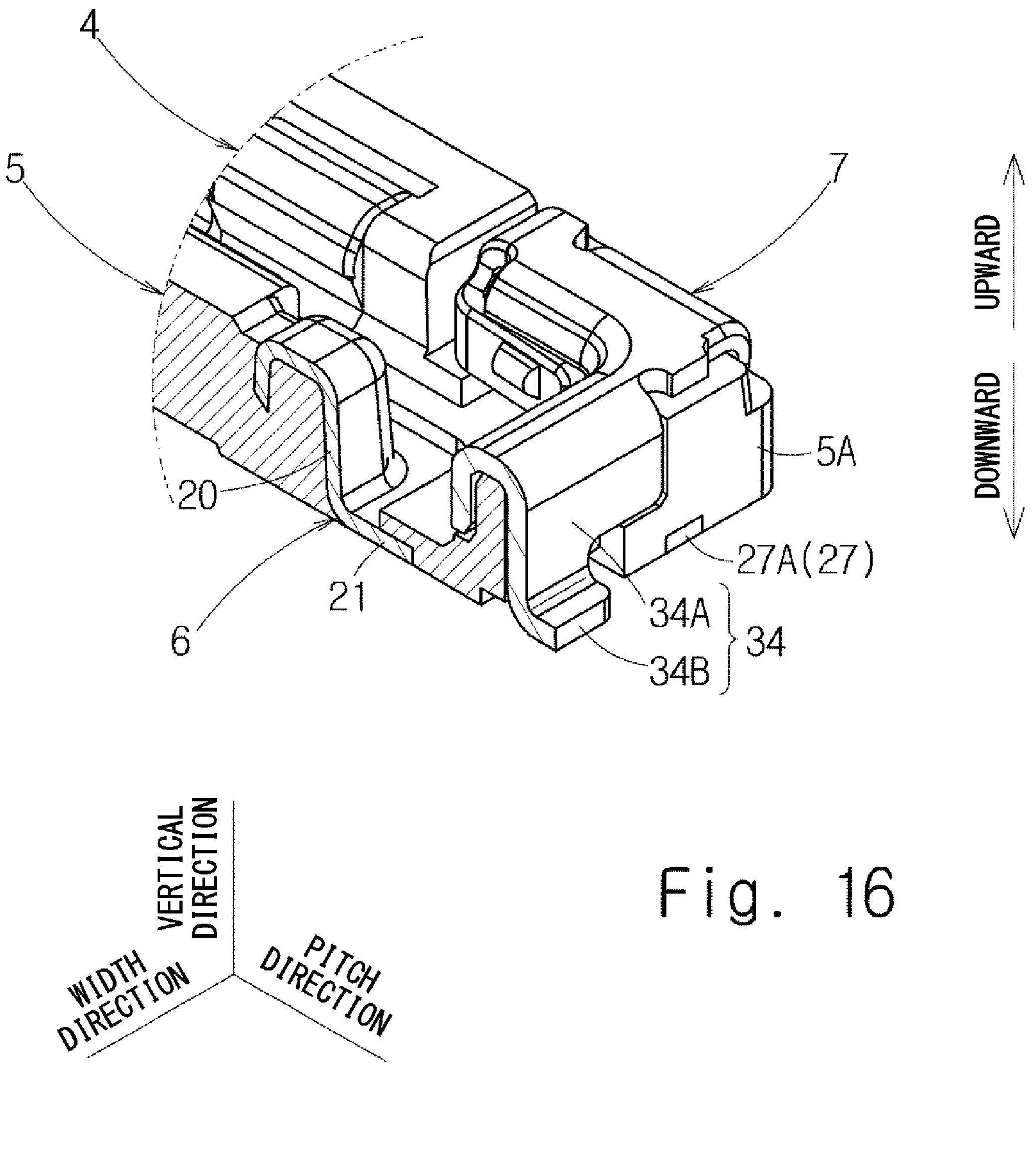
FIG. 16 is a cross-sectional perspective view of the socket connector when the socket connector is cut in the width direction.

FIGS. 14 to 16 show the protective metal fitting 6 integrated with the socket housing 5 by insert-molding.

As shown in FIGS. 14 to 16, the socket flange part 21 of the protective metal fittings 6 is exposed downward from the socket housing 5.

As shown in FIGS. 14 and 16, the two supporting parts 27 of the socket flange part 21 of the protective metal fittings 6 are exposed outward in the pitch direction from the socket housing 5. The end faces 27A of the two supporting parts 27 of the socket flange part 21 of the protective metal fitting 6 are located on the same plane as the end face 5A of the socket housing 5, which also faces outward in the pitch direction. Each of the end faces 27A is a cut surface that is formed when the socket flange part 21 of the protective metal fittings 6 is separated (i.e., cut out) from the carrier.

As shown in FIG. 14, the socket flange part 21 branches off in the width direction so as to bypass (i.e., to extend around and thereby evade) the soldering part 34B of the lengthwise soldering leg 34 of the socket auxiliary metal fitting 7. Therefore, it is possible to secure a sufficient clearance between the protective metal fitting 6 and the socket auxiliary metal fitting 7.

(Plug Connector 3)

Next, the plug connector 3 will be described with reference to FIGS. 17 to 19. Note that since the position of the plug connector 3 relative to the socket connector 2 is univocally determined in a state in which the plug connector 3 is mated with the socket connector 2, the three directions already defined with reference to FIGS. 1 to 4 will also be used as they are in the description of the plug connector 3 below.

Figure 17:
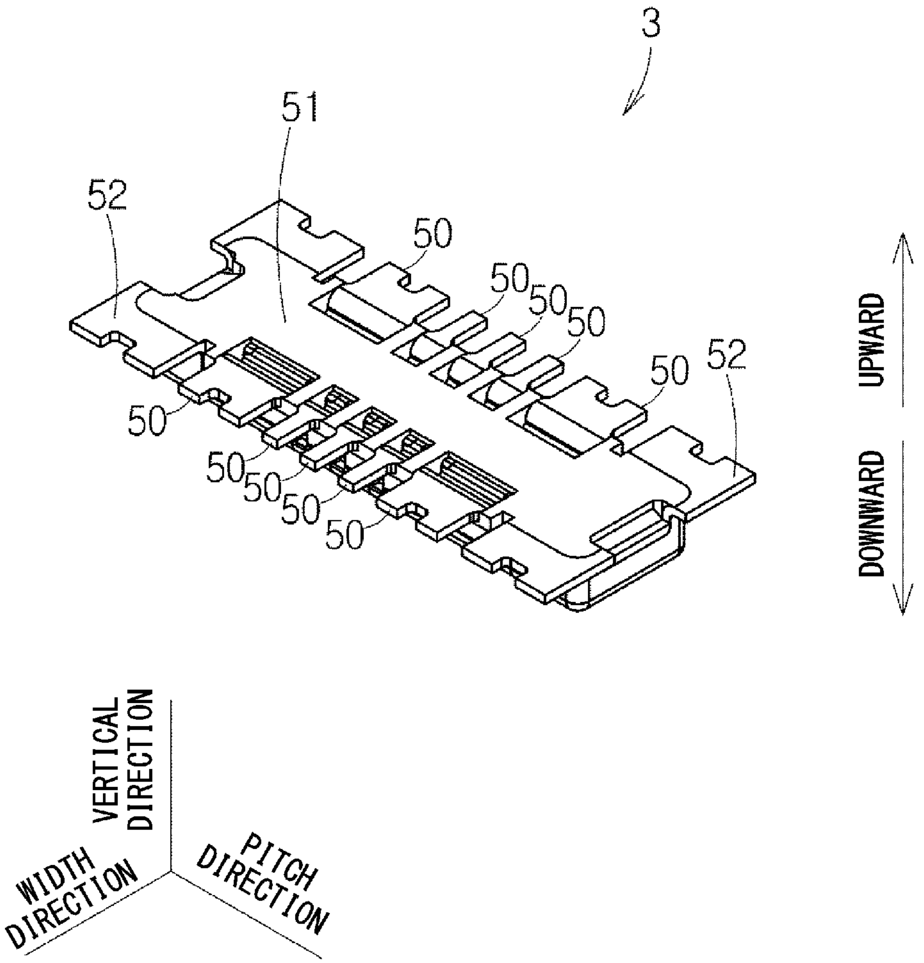
FIG. 17 is a perspective view of a plug connector.
Figure 19:
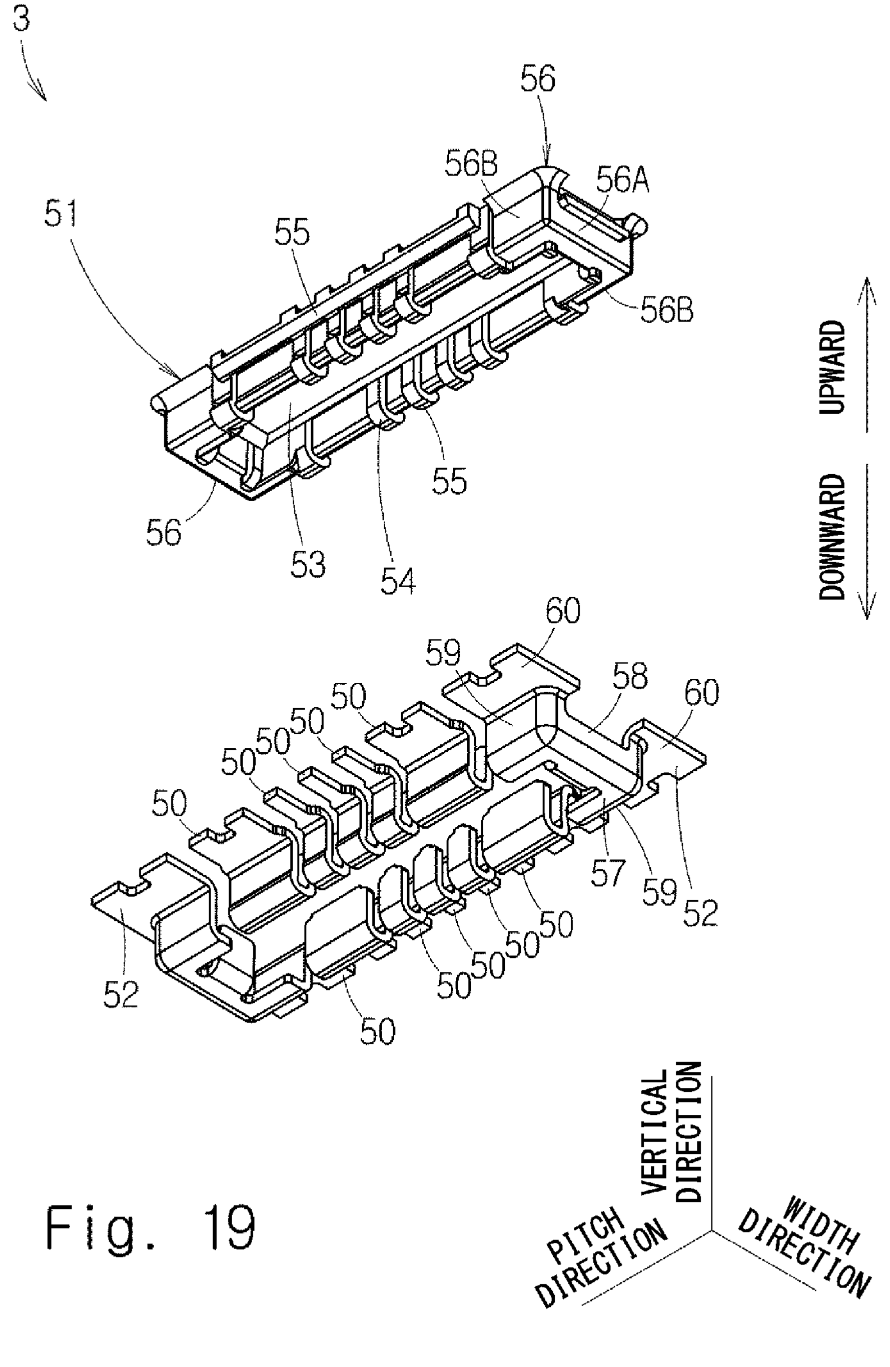
FIG. 19 is an exploded perspective view of the plug connector.
Figure 20:
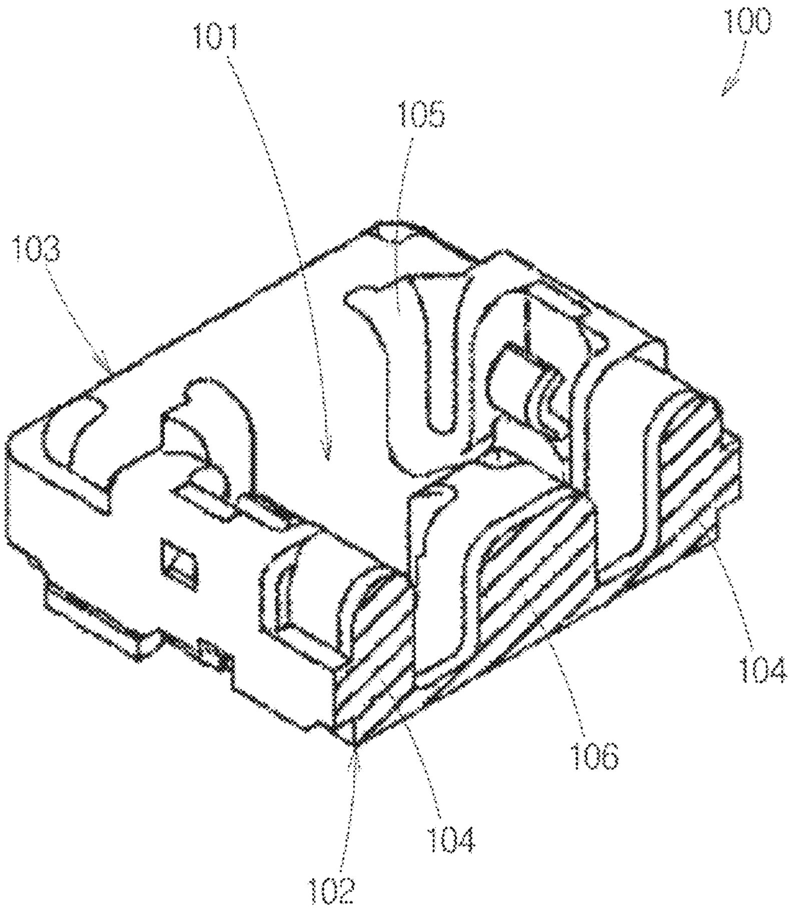
Fig. 20 (Prior Art)
FIG. 20 is a simplified drawing of FIG. 4 of Patent Literature 1.

As shown in FIGS. 17 to 19, the plug connector 3 includes a plurality of plug contacts 50, a plug housing 51 holding the plurality of plug contacts 50, and two plug auxiliary metal fittings 52. The plurality of plug contacts 50 and the two plug auxiliary metal fittings 52 are integrated with the plug housing 51 by insert-molding.

As shown in FIG. 19, the plug housing 51 is a plate member made of an insulating resin, having a rectangular shape in the plan view, and is elongated in the pitch direction.

The plug housing 51 includes a bottom plate 53 and a peripheral wall 54.

The bottom plate 53 is a flat plate whose thickness direction is parallel to the vertical direction.

The peripheral wall 54 is annularly formed and protrudes downward from the bottom plate 53. The peripheral wall 54 includes two contact holding walls 55 that hold the plurality of plug contacts 50, and two auxiliary metal fitting holding walls 56 that hold the two plug auxiliary metal fittings 52, respectively.

Each of the auxiliary metal fitting holding walls 56 is formed in a U-shape that opens inward in the pitch direction in the plan view.

Each of the plug contacts 50 is formed by punching and bending one metal plate.

The two plug auxiliary metal fittings 52 are provided to fix the plug housing 51 to the plug side board. Each of the plug auxiliary metal fittings 52 is formed by punching and drawing one metal plate. Since the shapes of the two plug auxiliary metal fittings 52 are identical to each other, only one of the plug auxiliary metal fittings 52 will be described hereinafter, and the description of the other plug auxiliary metal fitting 52 will be omitted.

As also shown in FIG. 19, each of the plug auxiliary metal fittings 52 includes a lower-surface protective part 57, a lengthwise protective part 58, two crosswise protective parts 59, and two plug flange parts 60.

The lower-surface protective part 57 has a U-shape that opens inward in the pitch direction in the plan view, and covers and protects the lower surface of the auxiliary metal fitting holding wall 56. The thickness direction of the lower-surface protective part 57 is parallel to the vertical direction.

The lengthwise protective part 58 is a part that covers and protects a lengthwise end face 56A of the auxiliary metal fitting holding wall 56 that faces outward in the pitch direction. The lengthwise protective part 58 extends upward from the end on the outer side of the lower-surface protective part 57 in the pitch direction.

The two crosswise protective parts 59 cover and protect two crosswise end faces 56B, respectively, of the auxiliary metal fitting holding wall 56 that face outward in the width direction. The two crosswise protective parts 59 extend upward from both ends, respectively, on the outer side of the lower-surface protective part 57 in the width direction.

The two plug flange parts 60 are parts that are soldered to the plug side board. The two plug flange parts 60 extend outward in the width direction from the upper ends of the two crosswise protective parts 59, respectively. The two plug flange parts 60 may be connected to each other.

Further, in this embodiment, each of the plug auxiliary metal fittings 52 is formed by a drawing process. Therefore, the lengthwise protective part 58 is directly connected to the two crosswise protective parts 59 without the lower-surface protective part 57 being interposed therebetween. As a result, the strength of the plug auxiliary metal fittings 52 in the vertical direction is ensured, and the plug auxiliary metal fittings 52 are less likely to be squashed in the vertical direction.

(Manufacturing Method)

Next, a method for manufacturing the socket connector 2 will be described.

Firstly, the socket housing 5 and the two protective metal fittings 6 shown in FIG. 4 are integrally formed by insert-molding.

Next, a plurality of socket contacts 4 and two socket auxiliary metal fittings 7 are attached to the socket housing 5. Specifically, the press-fitting part 41A of the soldering leg 41 of each of the socket contacts 4 shown in FIG. 13 is press-fitted into the corresponding slit 15A of the socket housing 5 shown in FIG. 4 from below thereof. Further, the press-fitting parts 33A of the two crosswise soldering legs 33 of the socket auxiliary metal fitting 7 shown in FIG. 12 are press-fitted into the two crosswise press-fitting grooves 16B, respectively, of the corresponding auxiliary metal fitting holding wall 16 of the socket housing 5 shown in FIG. 6 from above thereof.

Next, a method for manufacturing the plug connector 3 will be described. As shown in FIGS. 18 and 19, a plurality of plug contacts 50, a plug housing 51, and two plug auxiliary metal fittings 52 are integrally formed by insert-molding.

(Use)

Next, how to use the connector assembly 1 will be described.

In order to mount the socket connector 2 shown in FIG. 3 on the socket side board, the soldering part 41B of each of the socket contacts 4, and the two soldering parts 33B and 34B of each of the socket auxiliary metal fittings 7 are soldered to corresponding electrode pads, respectively, provided on the socket side board by solder reflowing.

Similarly, in order to mount the plug connector 3 shown in FIG. 17 on the plug side board, each of the plug contacts 50 and each of the plug auxiliary metal fittings 52 are soldered to corresponding electrode pads, respectively, provided on the plug side board by solder reflowing.

In order to mate the plug connector 3 with the socket connector 2, as shown in FIG. 1, the plug connector 3 is lowered (i.e., moved downward) toward the socket connector 2 in a state in which the plug connector 3 is opposed to the socket connector 2 in the vertical direction, so that the annular peripheral wall 54 of the plug connector 3 is inserted into the annular mating recessed part 17 of the socket connector 2. As a result, each of the plug contacts 50 is inserted into the U-shaped contact part 40 of the corresponding socket contact 4 while pushing the contact part 40 outward and thereby increasing the gap therebetween in the width direction. In this way, a mechanical and electrical connection between each of the plug contacts 50 and the corresponding socket contact 4 is achieved. Further, at the same time, each of plug auxiliary metal fittings 52 is inserted between the two spring pieces 32 of the corresponding socket auxiliary metal fitting 7 while pushing the two spring pieces 32 aside and outward in the width direction. As a result, a mechanical and electrical connection between each of the plug auxiliary metal fittings 52 and the corresponding socket auxiliary metal fitting 7 is achieved. The raised part 32A of each of the spring pieces 32 is in contact with the corresponding crosswise protective part 59. The electrical contact between each of the plug auxiliary metal fittings 52 and a respective one of the socket auxiliary metal fittings 7 may be used for supplying electric power.

Incidentally, it is not easy to visually check the relative positional relation between the plug connector 3 and the socket connector 2 until just before the plug connector 3 is mated with the socket connector 2. Therefore, in practice, a worker (or an operator) needs to shake the plug connector 3 in the pitch and width directions (e.g., move the plug connector 3 left and right, and back and forth) while pressing the plug connector 3 against the socket connector 2, and to wait until the plug connector 3 fits into the mating recessed part 17 of the socket connector 2. Regarding this process, there are cases where the worker (or the operator) mistakenly recognizes that the plug connector 3 is in the proper position relative to the socket connector 2 in the pitch direction even though the actual position of the plug connector 3 is deviated from the proper position, and thereby pushes the plug connector 3 hard against the socket connector 2. In such cases, the lower-surface protective part 57 of one of the plug auxiliary metal fittings 52 of the plug connector 3 shown in FIG. 19 comes into contact with the upper-surface protective part 22 of the cup-shaped protective part 20 of the corresponding protective metal fitting 6 of the socket connector 2 shown in FIG. 2, so that a large external force is applied downward to the upper-surface protective part 22.

In contrast to this, in this embodiment, the cup-shaped protective part 20 of the protective metal fitting 6 is formed in a cup-shape. To be specific, as shown in FIGS. 9 to 11, the cup-shaped protective part 20 at least includes the outward protective part 23 and the two lateral protective parts 25, and the two lateral protective parts 25 are directly connected to the outward protective part 23 without the upper-surface protective part 22 being interposed therebetween. Thus, the cup-shaped protective part 20 is not easily deformed by an external force.

For example, when a downward external force is applied to the upper-surface protective part 22 of the cup-shaped protective part 20, since the outward protective part 23 is directly connected to the two lateral protective parts 25 without the upper-surface protective part 22 being interposed therebetween, buckling distortion does not occur independently in the vertical direction in any of the outward protective part 23 and the two lateral protective parts 25. Therefore, the cup-shaped protective part 20 is less likely to be squashed in the vertical direction.

From the above-described examination, by adopting the configuration in which the cup-shaped protective part 20 of the protective metal fittings 6 includes the upper-surface protective part 22, the outward protective part 23, and the two lateral protective parts 25, and the outward protective part 23 and the two lateral protective parts 25 are directly connected to each other without the upper-surface protective part 22 being interposed therebetween, it is possible to provide a technical advantageous effect that the cup-shaped protective part 20 is not easily deformed by an external force, and the protective metal fittings 6 are unlikely to be broken (or damaged) when the plug connector 3 is mated with the socket connector 2.

A preferred embodiment according to the present disclosure has been described above, and the above-described embodiment has features described below.

As shown in FIGS. 2 to 4, a socket connector 2 includes: a socket housing 5 (a housing) in which an island-like part 11 and a peripheral wall 12 surrounding the island-like part 11 project upward from a bottom plate 10; a plurality of socket contacts 4 (contacts) arranged in the housing 5; and two protective metal fittings 6 configured to protect the island-like part 11. As shown in FIGS. 5 to 8, the island-like part 11 includes an island-like main part 13, and two island-like end parts 14 adjacent to the island-like main part 13 in a pitch direction of the plurality of socket contacts 4. Each of the island-like end parts 14 has an upper surface 14A, an outward lengthwise side surface 14C (a first side surface) facing outward in the pitch direction, and two crosswise side surfaces 14B (second side surfaces) facing in the width direction. As shown in FIGS. 9 to 11, each of the protective metal fittings 6 includes an upper-surface protective part 22 covering the upper surface 14A, an outward protective part 23 (a first side-surface protective part) extending downward from the upper-surface protective part 22 and covering the outward lengthwise side surface 14C, and two lateral protective parts 25 (second side-surface protective parts) extending downward from the upper-surface protective part 22 and covering the two crosswise side surfaces 14B, respectively. The outward protective part 23 and the two lateral protective parts 25 are directly connected to each other without the upper-surface protective part 22 being interposed therebetween. This configuration allows each of the island-like end parts 14 to be effectively protected as described above.

Note that although the socket connector 2 includes the two protective metal fittings 6 in this embodiment, any one of the protective metal fittings 6 may be omitted.

Further, as shown in FIG. 8, each of the island-like end parts 14 has an inward lengthwise side surface 14D (a third side surface) facing inward in the pitch direction. Each of the protective metal fittings 6 further includes an inward covering part 24 (a third side-surface covering part) extending downward from the upper-surface protective part 22 and covering the inward lengthwise side surface 14D. In this configuration, the cup-shaped protective part 20 is less likely to tip over outward in the pitch direction.

Further, as shown in FIG. 10, a notch 24A is formed in the inward covering part 24. In this configuration, as shown in FIG. 8, a connection part 11B that connects the island-like main part 13 and each of the island-like end parts 14 is formed. This configuration allows molten resin to flow from the island-like main part 13 to each island-like end part 14 during the injection-molding of the socket housing 5, and thereby enables simplifying mold construction and contributes to reducing the manufacturing costs.

Note that a hole may be formed in the inward covering part 24, instead of the notch 24A formed in the inward covering part 24. This configuration also contributes to reducing the manufacturing costs by the same reason as above.

Further, as shown in FIG. 9, each of the protective metal fittings 6 includes a socket flange part 21 (flange part) that connects to the outward protective part 23 and the two lateral protective parts 25. The socket flange part 21 is exposed downward. In this configuration, the displacement of the lower end of the cup-shaped protective part 20 outward in the pitch direction and outward in the width direction is controlled, and therefore the displacement of the cup-shaped protective part 20 in the vertical direction is more effectively controlled.

Further, as shown in FIG. 16, the socket flange part 21 is exposed outward in the pitch direction from the socket housing 5. This configuration allows each of the protective metal fittings 6 to be held by a carrier using the socket flange part 21 during the insert-molding of the socket housing 5 and each of the protective metal fittings 6.

Further, as shown in FIG. 14, the socket flange part 21 branches off in the width direction while extending outward in the pitch direction. This configuration easily secures a clearance between the soldering part 34B of the lengthwise soldering leg 34 of the socket auxiliary metal fittings 7 and the socket flange part 21 of the protective metal fitting 6.

Note that the above-described embodiment can be modified, for example, as described below.

That is, although the protective metal fitting 6 and the socket auxiliary metal fitting 7 are separate components in the above-described embodiment, the protective metal fitting 6 and the socket auxiliary metal fitting 7 may instead be formed as one component.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A socket connector comprising:

a housing in which an island-like part and a peripheral wall surrounding the island-like part project upward from a bottom plate;

a plurality of contacts arranged in the housing; and a protective metal fitting configured to protect the island-like part, wherein the island-like part includes an island-like main part, and an island-like end part adjacent to the island-like main part in a pitch direction of the plurality of contacts, the island-like end part has an upper surface, a first side surface facing outward in the pitch direction, and two second side surfaces facing in a width direction perpendicular to the pitch direction, the protective metal fitting includes an upper-surface protective part covering the upper surface, a first side-surface protective part extending downward from the upper-surface protective part and covering the first side surface, and two second side-surface protective parts extending downward from the upper-surface protective part and covering the two second side surfaces, respectively, and the first side-surface protective part and the two second side-surface protective parts are directly connected to each other without the upper-surface protective part being interposed therebetween, wherein the protective metal fitting includes a flange part connecting to the first side-surface protective part and the two second side-surface protective parts, wherein the flange part is exposed downward.

2. The socket connector according to claim 1, wherein the island-like end part has a third side surface facing inward in the pitch direction, and the protective metal fitting further includes a third side-surface covering part extending downward from the upper-surface protective part and covering the third side surface.

3. The socket connector according to claim 2, wherein a hole or a notch is formed in the third side-surface covering part.

4. A socket connector comprising:

a housing in which an island-like part and a peripheral wall surrounding the island-like part project upward from a bottom plate;

a plurality of contacts arranged in the housing; and a protective metal fitting configured to protect the island-like part, wherein the island-like part includes an island-like main part, and an island-like end part adjacent to the island-like main part in a pitch direction of the plurality of contacts, the island-like end part has an upper surface, a first side surface facing outward in the pitch direction, and two second side surfaces facing in a width direction perpendicular to the pitch direction, the protective metal fitting includes an upper-surface protective part covering the upper surface, a first side-surface protective part extending downward from the upper-surface protective part and covering the first side surface, and two second side-surface protective parts extending downward from the upper-surface protective part and covering the two second side surfaces, respectively, and the first side-surface protective part and the two second side-surface protective parts are directly connected to each other without the upper-surface protective part being interposed therebetween, wherein the protective metal fitting includes a flange part connecting to the first side-surface protective part and the two second side-surface protective parts, wherein the flange part is exposed outward in the pitch direction from the housing.

5. The socket connector according to claim 4, wherein the flange part branches off in the width direction while extending outward in the pitch direction.

* * * * *